United States Patent [19]

Robinson

[11] Patent Number: 4,645,939
[45] Date of Patent: Feb. 24, 1987

[54] AUTOMOTIVE DEVICE FOR INHIBITING ENGINE IGNITION

[76] Inventor: Ronald J. Robinson, 70 Partridge Rd., Pinehurst, Mass. 01866

[21] Appl. No.: 763,649

[22] Filed: Aug. 8, 1985

[51] Int. Cl.$^4$ ............................................. B60R 25/04
[52] U.S. Cl. ............................ 307/10 AT; 307/10 R; 307/10 LS; 307/9; 340/52 R; 340/63; 340/64; 123/179 R; 290/35
[58] Field of Search .................... 307/9, 10 R, 10 AT, 307/10 LS; 340/52 R, 63, 64, 542, 543; 123/179 R; 290/26, 35, DIG. 6

[56] References Cited

U.S. PATENT DOCUMENTS

| | | |
|---|---|---|
| 2,495,708 | 1/1950 | Draeger et al. |
| 3,610,943 | 10/1971 | Jones |
| 3,665,447 | 5/1972 | Bidwell et al. |
| 3,707,710 | 12/1972 | Adler et al. |
| 3,761,921 | 9/1973 | Adler et al. |
| 3,790,933 | 2/1974 | Cort ..................................... 340/63 |
| 3,794,968 | 2/1974 | Hill |
| 3,876,884 | 4/1975 | Housman et al. ................. 340/64 X |
| 3,886,540 | 5/1975 | Sussman et al. |
| 3,942,151 | 3/1976 | Takeuchi |
| 4,093,870 | 6/1978 | Epstein |
| 4,232,289 | 11/1980 | Daniel |
| 4,262,279 | 4/1981 | Dublirer ................................. 340/63 |
| 4,297,674 | 10/1981 | Merten ................................... 340/63 |
| 4,333,074 | 6/1982 | Sutherland et al. ............ 340/543 X |
| 4,438,426 | 3/1984 | Adkins ................................... 340/64 |
| 4,452,197 | 6/1984 | Weber ................................ 340/64 X |
| 4,463,340 | 7/1984 | Adkins et al. ......................... 340/64 |

*Primary Examiner*—William M. Shoop, Jr.
*Assistant Examiner*—Shik Luen Paul Ip
*Attorney, Agent, or Firm*—Florence U. Reynolds

[57] ABSTRACT

An automotive device for inhibiting engine ignition in response to operation of an ignition switch in a manner inconsistent with a prescribed routine which varies unpredictably. The device has two operational modes for impairment detection and theft deterrence, the respective modes being enabled by a plurality of switches. A gauge warning light is energized in response to the ignition switch being turned to a first active position. After a variable interval of time the gauge warning light dims. Following the initiation of dimming, the operator must turn the ignition switch to a second active position within a "window of time", whereby the operator's reflexes and concentration are tested. Failure of the operator to turn the ignition switch within the "window of time" results in disablement of the starter.

11 Claims, 2 Drawing Figures

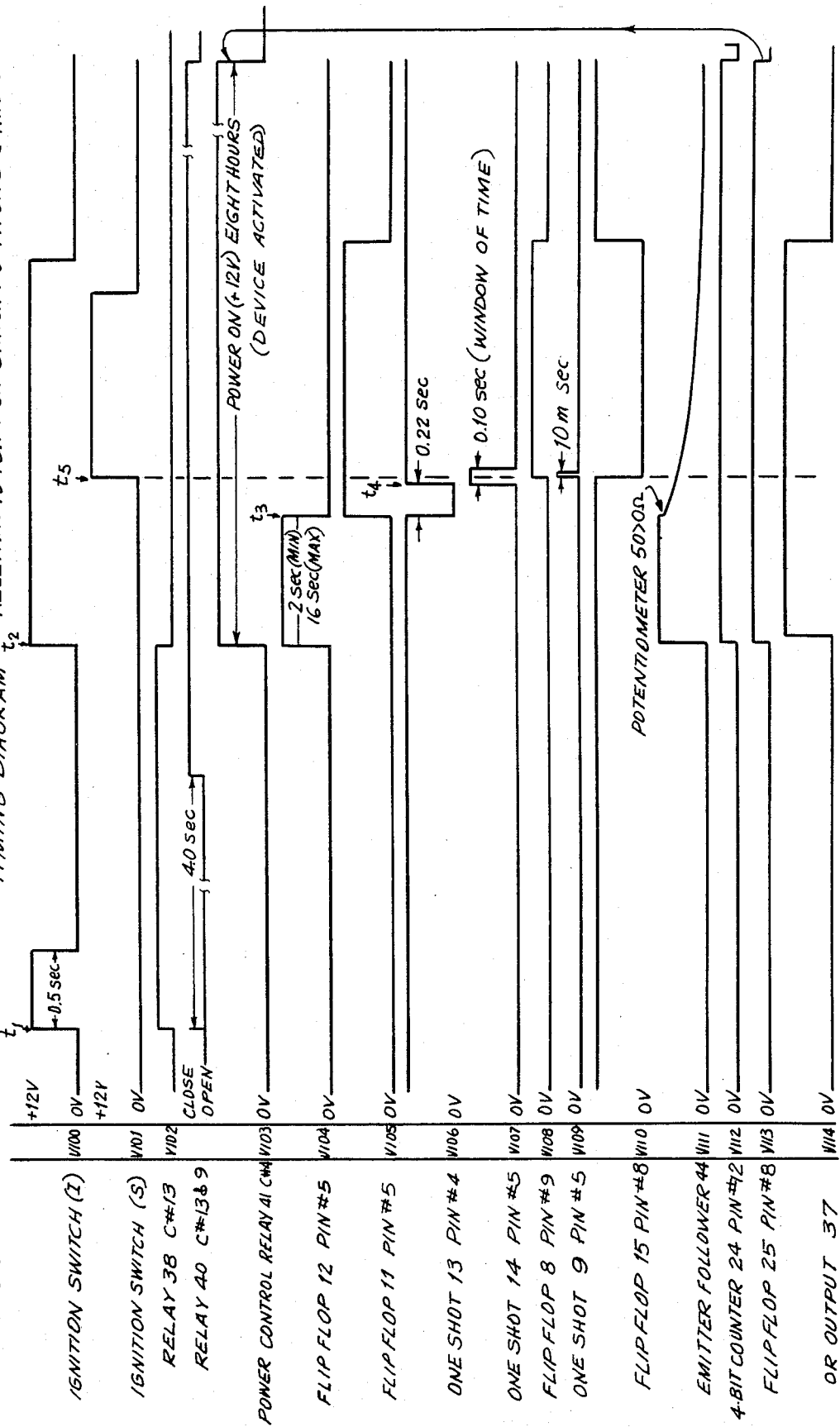

AUTOMOTIVE DEVICE FOR INHIBITING ENGINE IGNITION

BACKGROUND OF THE INVENTION

1. Field of the Invention

This invention relates to an automotive device for inhibiting the activation of the starter by means of the ignition switch when the operator is impaired or a theft is being attempted.

2. Prior Art

Devices for testing driver capability and for preventing auto theft are well known.

U.S. Pat. No. 3,886,540 to Sussman et al. discloses a coordination test whereby a plurality of lights and pushbuttons are disposed on a panel. An ignition interlock device prevents vehicle operation unless the operator presses the correct buttons in response to illumination of preselected lights.

U.S. Pat. No. 3,610,943 to Jones discloses a memory test whereby randomly displayed digits must be entered by way of a keyboard after the display is turned off. The correct number must be entered within a fixed interval of time in order to provide a control signal which energizes the starter. A random digit memory test is also disclosed in U.S. Pat. No. 3,942,151 to Takenchi.

U.S. Pat. No. 4,232,289 to Daniel discloses a combination security lock and impaired driver deterrent. A system for testing the reaction of a human subject is disclosed in U.S. Pat. No. 3,794,968 to Hill wherein the magnitude of a quantity which changes at a nonuniform predictable rate utilizing information provided by minimal cues, in particular, a pair of flashing lights which indicate whether the rate of change is being overestimated or underestimated. This analyzer device is interlocked with the ignition system of an automobile.

The flicker fusion frequency phenomenon is utilized in several prior art devices for the testing of vigilance. U.S. Pat. No. 2,495,708 to Draeger et al. discloses an apparatus for performing the flicker fusion test to detect an abnormal condition. The flicker fusion threshold is the greatest number of flashes of light per second which are perceived as a flashing or flickering light. U.S. Pat. Nos. 3,707,710 and 3,761,921 to Adler et al. disclose a device for testing the vigilance of a person based on his flicker fushion threshold, comprising a flicker luminous indicator. In the latter Adler patent, means are provided for adjusting the flicker frequency and for producing an acoustical signal when the frequency falls below a limit value, this acoustical signal indicating that vigilance of the tested person is below an allowable level.

In U.S. Pat. No. 3,665,447 to Bidwell et al., a method and apparatus are disclosed for preventing vehicle operation of an inebriated person using the flicker fusion frequency phenomenon. The light source randomly changes between an illumination which appears flashing to the sober individual and an illumination which appears steady. Means are provided to prevent operation of the vehicle until a signal from the individual and a signal representing the light change are received contemporaneously. The reduction in flicker fusion frequency varies directly with the amount of alcohol ingested. The operational mode of the light (i.e. flickering or steady) is controlled by a timer. The flickering mode is enabled for a predetermined period depending on the length of a notch in the timer, during which period of time the vehicle operator must operate a switch to activate the ignition system.

U.S. Pat. No. 4,093,870 to Epstein discloses an apparatus for testing reflexes based on the activation of a single key or switch after the passage of a certain amount of time, instead of the activation of a correct button or combination of buttons out of a plurality of buttons. The apparatus can be used in conjunction with the ignition of an automobile. The apparatus, after certain lapsed times, creates a condition which is of predetermined time duration. The correct response must be given by the operator within the set time period. If a number of conditions are satisfied, a monostable multivibration outputs a signal of predetermined duration which unlocks the lock. The conditions are satisfied by the entry of a four-digit combination. In response to the display of each digit, the operator must activate a switch before the number is passed in order to operate the lock. The test of reflexes merely requires that the switch be activated within a predetermined time span is response to the display of each digit of the predetermined combination.

The devices disclosed in the Bidwell et al. and Epstein patents suffer from the disadvantage that a display element distinct and separate from those already incorporated in the vehicle dashboard is required. In the case of the Bidwell et al. device, a gas discharge lamp would be a light source suitable for flashing at the flicker fusion frequency. In Epstein, a display cell is connected to the plurality of outputs of decade counter 50 by way of decoder 58, whereby a single-digit number is displayed. Thus, both the Bidwell et al. and Epstein devices for detecting operator impairment suffer from the disadvantage that they cannot be embodied in the form of a modular black box which can be easily plugged into an automotive interface.

SUMMARY OF THE INVENTION

The object of the invention is to provide an impairment detection device in the form of a modular black box which can be plugged into an automotive interface without the attachment of an additional display element.

Another object of the invention is to provide a device with switch-controlled operational modes, the device being settable to an impairment detection mode acting concurrently as theft deterrence or a more dedicated theft deterrence mode.

A further object of the invention is to provide an impairment detection device which is capable of variably controlling the dimming of a gauge warning light on an automobile dashboard.

Yet another object of the invention is to provide a device for testing the concentration, judgement, visual acuity and reflexes of a vehicle operator prior to the enablement of the starter.

A further object is to provide a simple modular device which can be plugged into a vehicle dashboard for testing the state of impairment of the vehicle operator.

The foregoing objects of the invention are achieved by providing an impairment detection device comprising a digital circuit card for controlling the timing of signals in response to operation of the ignition switch and an analog circuit card for dimming a gauge warning light and activating a starter in respones to control signals from the digital circuit card.

The impairment detection device in accordance with the invention will comprise a modular black box which can be connected to the ignition switch, the starter, and a gauge warning light on the dashboard on an automobile by way of a suitable plug or jack. The impairment detection device prevents activation of the starter in the absence of timely operation of the ignition switch in response to random dimming of the gauge warning light. A voltage is supplied to the gauge warning light by an emitter follower, which outputs a constant voltage in response to a high signal of variable duration output by a flip-flop and a decreasing voltage thereafter. The gauge warning light is lit in response to the ignition switch being turned to the first active position. The gauge warning light dims following the passage of the variable duration due to the decrease in voltage. An oscillator outputs two clocking signals of different frequencies to the D and CLK input terminals of the flip-flop, as a result of which the high level output by the flip-flop will have a variable (i.e., unpredictable) duration. At a predetermined period of time subsequent to the end of the high level output by the flip-flop, a "window of time" pulse is produced by a one-shot. In order to activate the starter, a second pulse must be produced concurrently with the first pulse by a second one-shot in response to timely turning the ignition switch to the second active position, i.e., the operator, first, must have sufficient concentration and visual acuity to recognize the dimming of the gauge warning light and, second, must have sufficiently sharp reflexes to turn the ignition switch during the so-called "window of time." If the operator is unable to operate the ignition switch correctly because of impairment of his concentration and reflexes, then the starter cannot be activated, thereby preventing the impaired operator from driving the vehicle.

The operator will be allowed three unsuccessful attempts to start the vehicle in the prescribed manner. Following the third attempt, the device is programmed such that the operator cannot make any further attempts to activate the starter for a period of twenty minutes (or any other suitable period of time).

The device of the present invention has two modes of operation: an impairment detection mode and a theft deterrence mode. When the device is set up in the impairment mode the chances of successfully activating the starter purely by accident or guesswork are less than one in one hundred or 1%. The digital circuit has four SPST switches, the settings of which are used to control which mode is operational.

The device is activated for a period of eight hours when the ignition switch is turned to a first active position, and returned to the OFF position, and then returned to the first active position. Following this eight-hour period (or a period of any other desired length), the device will be automatically deactivated.

A fifth SPST switch is provided which will enable or disable a special timing function. If the fifth switch is placed in an ON position, the device will be activated for the above-described eight-hour period. If the fifth switch is placed in an OFF position, the operator must initially start the vehicle in the prescribed manner, following which the operational mode will be deactivated. The vehicle starting system will thereafter operate normally until the ignition switch is placed in the OFF position and left there for a predetermined period of time (e.g. 20 minutes). After this period of time, the operational mode will become activated, thereby preventing problems arising from brief stops for refueling and so forth.

BRIEF DESCRIPTION OF THE DRAWINGS

FIG. 2 is a timing diagram depicting output voltages with respect to a time axis.

DETAILED DESCRIPTION OF THE PREFERRED EMBODIMENT

Figure 1:
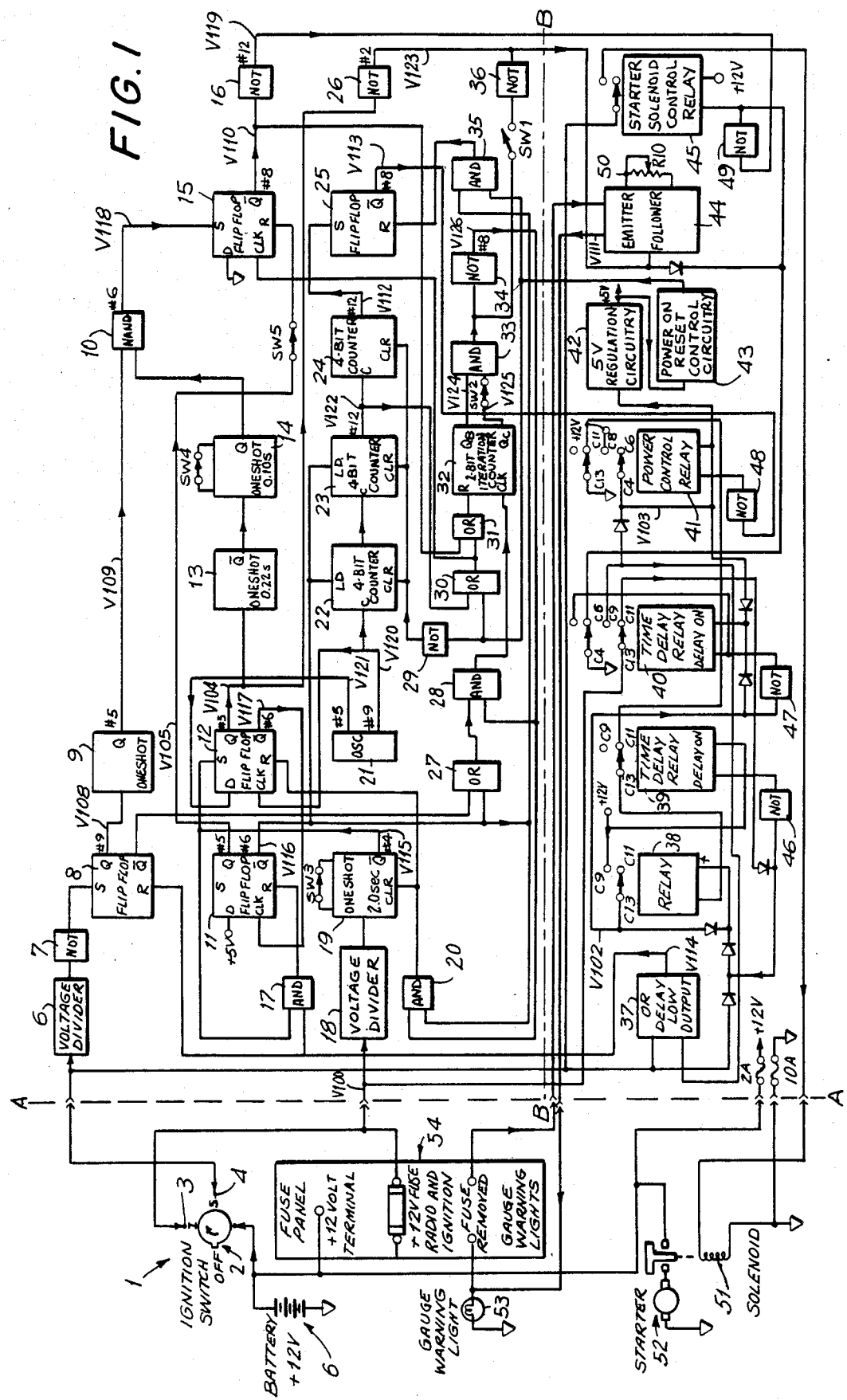
FIG. 1 is a block diagram of digital and analog circuitry in interface with the automobile circuitry.

The structure of the preferred embodiment of the invention will be described with reference to the block diagram of FIG. 1. The apparatus of the present invention is a separate unit designad to plug into the automobile circuitry. The device consists of two bread board circuit cards, one of which is digital and the other of which is analog. The digital card consists of digital integrated cicuits for performing timing and control functions. The analog card consists mainly of discrete components, such as relays and transistors, for performing power control. The interface between the modular apparatus and the automobile circuitry is depicted by dashed line A—A in FIG. 1. The digital and analog cards are diagrammatically depicted by the dash-dot line B—B extending horizontally from line A—A in FIG. 1. The device interfaces with the automobile circuitry by way of seven wire conductors connected to a female molex connector (not shown) which mates with the male connector in the vehicle. The seven connections are denoted by the pairs of mated arrowheads arrayed along line A—A.

The ignition switch 1 comprises a rotatable contact terminal 2 which is connected to a +12-volt battery 5. The ignition switch can be rotated so that the contact terminal 2 takes on one of three positions: the OFF position, the I position and the S (start) position. Contact terminal 2 engages contact terminal 3 in the I position and contact terminal 4 in the S position.

The contact terminal 4 is connected to the input terminal of voltage divider 6, the output terminal of which is in turn connected to inverter (NOT) 7. The output terminal of inverter 7 is connected to the set(s) terminal of flip-flop 8. The Q and $\overline{Q}$ output terminals are respectively connected to the monostable multivibrator (hereinafter "one-shot") 9 and the first input terminal of OR gate 27. The reset (R) terminal of flip-flop 8 is connected to the output terminal of OR circuit 37. The Q output terminal of one-shot 9 is in turn connected to the first-input terminal of NAND gate 10.

The CLK terminal of flip-flop 11 is connected to the $\overline{Q}$ output terminal of flip-flop 12. The Q terminal of flip-flop 11 is connected to the reset (R) terminal of flip-flop 15 by way of switch SW5. The D terminal of flip-flop 11 is connected to a +5-volt source and the reset terminal of flip-flop 11 is connected to the output terminal of AND gate 17. The input terminals of AND gate 17 respectively receive signals from the $\overline{Q}$ output terminal of one-shot 19 and the output terminal of OR circuit 37. The $\overline{Q}$ output terminal of flip-flop 11 is connected to the load (LD) terminals of 4-bit counters 22 and 23, the second input terminal of OR gate 27, and the first input terminals of AND gates 20 and 35 respectively.

The set (S) terminal of flip-flop 12 is connected to receive the same signal from the $\overline{Q}$ output terminal of one-shot 19 as does AND gate 17. The D terminal of flip-flop 12 receives clocking signals from oscillator 21 by way of the first output terminal (pin #5), whereas the CLK terminal receives clocking signals of different frequency from the second output terminal (pin #9) of free-running oscillator 21. The reset (R) terminal of flip-flop 12 is connected to the output terminal of AND gate 20, as is the clear (CLR) terminal of one-shot 19, the input terminals of AND gate 20 being connected to the $\bar{Q}$ output terminal of flip-flop 11 and the output terminal of inverter (NOT) 34. The Q output terminal of flip-flop 12 is connected to both one-shot 13 and inverter 26. The output terminal of inverter 26 is connected to Darlington emitter follower 44.

The output terminal of one-shot 13 is connected to one-shot 14, the output terminal of the latter being in turn connected to the second input terminal of NAND gate 10. The one-shot 14 is controlled by switch SW4 connected across a pair of terminals. The output terminal of NAND gate 10 is connected to the set (S) terminal of flip-flop 15. The D and CLK terminals of flip-flop 15 are respectively connected to ground and the output terminal of OR gate 30. The $\bar{Q}$ output terminal of flip-flop 15 is connected to inverter (NOT) 16 and the first input terminal of OR gate 31, the second input terminal of the latter being connected to the output terminal of OR gate 30. The output terminal of inverter 16 is connected to the input terminal of inverter 49.

The second output terminal (pin #9) of free-running oscillator 21 is connected to the count (C) terminal of 4-bit counter 22, the carry output terminal of which is in turn connected to the count (C) terminal of 4-bit counter 23. The carry output terminal of counter 23 is connected to the count (C) terminal of 4-bit counter 24 and the first input terminal of OR gate 30. The second input terminal of OR gate 30 is connected to the output terminal of power-on reset control circuit 43, which is also connected to inverter (NOT) 29 and the second input terminal of AND gate 35. The output terminal of inverter 29 is connected to the clear (CLR) terminals of counters 22, 23 and 24. The carry output terminal of counter 24 is connected to the set (S) terminal of flip-flop 25, the reset (R) terminal of the latter being connected to the output terminal of AND gate 35. The $\bar{Q}$ output terminal of flip-flop 25 is connected to inverter (NOT) 48, which is in turn connected to power control relay 41.

The output terminal of OR gate 27, which receives input signals from flip-flops 8 and 11, is connected to the first input terminal of AND gate 28. The second input terminal of AND gate 28 is connected to the output terminal of inverter (NOT) 34. The output terminal of AND gate 28 is connected to CLK terminal of 2-bit iteration counter 32. The reset (R) terminal of counter 32 is connected to the output terminal of OR gate 31. The output terminals $Q_B$ and $Q_C$ of iteration counter 32 are respectively connected to the input terminals of AND gate 33, with switch SW2 being arranged between terminal $Q_C$ and AND gate 33. The output terminal of AND gate 33 is connected to inverters (NOT) 34 and 36, the latter being connected by way of switch SW1. The output terminal of inverter 36 is joined to the conductor connecting inverter 26 and emitter follower 44. The output terminal of inverter (NOT) 34, as previously noted, is connected to AND gates 20 and 28.

The contact terminal 3, corresponding to ignition switch position I, is connected to voltage divider 18, which is in turn connected to one-shot 19. One-shot 19 is controlled by switch SW3 connected across its terminals. Contact terminal 3 is further connected to the plus terminal of relay 38 by way of contacts C11 and C13, controlled by time delay relay 40 and a pair of diodes. Contact terminal 4 is connected to the first input terminal of OR circuit 37 with delay and is further connected to the plus terminal of relay 38 by way of a pair of diodes. Contact terminal 4 also connected to the solenoid 51 by way of the terminals controlled by starter solenoid control relay 45. One terminal of control relay 45 is connected to a +12 volt supply and the other terminal is connected to contacts C4 and C6 controlled by time delay relay 40, to output terminal of inverter 26 by way of a diode, and to the output terminal of inverter 49.

The second input terminal of OR circuit 37 is connected to contact terminal 3 of ignition switch 1 by way of contact terminals C13 and C9 controlled by time delay relay 40. The plus terminal of time delay relay 39 is connected to a +12-volt supply. The plus terminals of time delay relay 40 and relay 38 are connected to the same +12-volt supply by way of a diode and the contact terminals C13 and C9 controlled by relay 38. The second terminal of relay 38 is connected to ground by way of contact terminals C13 and C11 controlled by power control relay 41 and by way of contact terminals C13 and C11 controlled by time delay relay 39. The second terminal of time delay relay 39 is connected to contact terminal 3 by way of contact terminals C13 and C11 controlled by time delay relay 40, a diode, and an inverter (NOT) 46. The second terminal of time delay relay 40 is connected to a +12-volt source by way of inverter (NOT) 47 and contacts C13 and C9 controlled by relay 38. The second terminal of time delay relay 40 is connected to ground by way of contact terminals C4 and C8 controlled by relay 40.

The plus terminals of relays 40 and 41 and the input terminal of regulation circuit 42 are connected to contact terminal 3 of the ignition switch by way of contact terminals C13 and C9 controlled by relay 40. The other terminal of power control relay 41 is connected to the output terminal of inverter (NOT) 48. Alternatively, the plus terminal of control relay 41 is connected to a +12-volt source by way of contact terminals C4 and C8 controlled by control relay 41. The +5-volt output of regulation circuit is input to power on reset control circuit 43. The output terminal of reset control circuit 43 is connected to AND gate 35, OR gate 30, and inverter (NOT) 29.

A potentiometer 50 is interconnected with the input of the emitter follower 44. The output terminal of emitter follower 44 is connected to gauge warning light 53 and one of the gauge fuse terminals, and the input terminal is connected to the other gauge fuse terminal in fuse panel 54.

Finally, the starter 52 is connected to battery 5 and controlled by solenoid 51. Battery 5 is connected to a +12-volt terminal on fuse panel 54. A +12-volt fuse on fuse panel 54 is connected to contact terminal 3 of ignition switch 1.

As noted earlier, the present invention has two modes of operation: impairment detection and theft deterrence. The digital circuit card has five settable switches SW1-SW5. Switches SW1-SW4 are used to control which mode is operational. Switch SW5, which is normally placed in the ON postion, enables or disables a special timing function. The impairment detection mode of operation is invoked by setting switches SW2-SW4 to the ON position and SW1 to the OFF position. The theft deterrence mode of operation is invoked by setting switches SW2-SW4 to the OFF position and switch SW1 to the ON position.

If the ignition switch 1 is turned to the I position (whereby the generator and oil warning lights are turned on) and then quickly returned to the OFF position, the device will be activated when ignition switch 1 is turned to the I position again. The period of activation is eight hours, following which amount of time the device will automatically self-deactivate.

When the device for detecting impairment is activated, the gauge warning lights 53 will turn on, i.e. the device is activated and the gauge warning lights are turned on simultaneously. In order to start the motor, the operator must first be able to recognize the dimming of the dash lights, which takes place very slowly. The time period during which the gauge warning lights stay on before dimming occurs will be approximately 9 seconds plus or minus 7 seconds. This time period will constantly vary.

The critical feature of the impairment detection device of the present invention is that a window (span) of time is provided after the gradual dimming begins, which window of time is initiated at a predetermined time subsequent to the start of dimming. The duration of this window of time is adjustable. Following recognition of the dimming by the operator, the operator must quickly turn the ignition switch to the start (S) position such that a voltage pulse is produced within the time span of the window, i.e. concurrently.

If the ignition switch is turned before the lights dim or at an instant in time outside the window, the engine starter will not activate. In the event that the operator fails to activate the starter, the ignition switch must be returned to the OFF position, following which the above-described sequence is repeated. The operator will be allowed three attempts to activate the starter. After the third failure, the ignition system will be disabled for a period of twenty minutes, following which the operator can try again.

The above-described operation is a test of the vehicle operator's concentration, judgment, vision, and reaction time. The window of time represents the tolerance within which the operator must be able to respond. This tolerance, which forces the operator to turn the ignition switch immediately in response to the observation of dimming, can be adjusted with an increase (or decrease) of the window of time. In particular, the window span could be increased considerably such that the operator's concentration would not be tested. In the preferred embodiment depicted in FIG. 1, the tolerance is a window of time measuring 0.10 second. The dimming can be adjusted to occur very slowly or very rapidly. If the dimming occurs rapidly, the operator would be able to discern the dimming more easily and turn the ignition switch in response thereto, so that the engine can be started with considerably less concentration on the part of the operator. The tolerance can be increased or decreased by adjusting the time span of the window or the rate of change of dimming. Minor changes can be made in the circuitry shown in FIG. 1 for effecting these adjustments.

The operation of the preferred embodiment of the invention will now be described in detail with reference to the timing diagram of FIG. 2, which depicts the various output voltages with respect to the time axis. The switches shown in FIG. 1 are set in the positions corresponding to the impairment detection mode.

Initially the device is deactivated with no power available to either the digital or the analog circuit card. When the ignition switch 1 is turned to the first active position (labeled I in FIG. 1) at time $t_1$, a voltage is produced which activates relay 38 on the analog circuit card. All of the relays are shown in the deactivated position. If the ignition switch 1 stays in either the I position or the start (S) position for at least 1.5 seconds, the time (delay ON) relay 39 will be activated, thereby opening contacts C11 and C13 thereof and deactivating relay 38. If the ignition switch 1 is turned to the I position and immediately returned to the OFF position, the time delay relay 39 will not activate and relay 38 will remain activated, thereby supplying +12 volts to the time (delay ON) relay 40 by way of contacts C13 and C9 controlled by relay 38. After 4.0 seconds, relay 40 will activate, closing contacts C13 and C9 controlled thereby. When ignition switch 1 is again turned to the I position at time $t_2$, power control relay 41 is activated, closing contacts C4 and C8 controlled thereby and supplying +12 volts to the +5 volt regulation circuit 42.

The output of power on reset control circuit 43 is initially low, which resets or initializes flip-flop 25 and counters 22–24 and 32. The output becomes high after a delay of approximately 25 msec. After the ignition switch 1 as been returned to the OFF position (after time $t_2$), the relay 41 remains ON via pin #8 (the $\overline{Q}$ terminal) of flip-flop 25, which is set high at time $t_2$.

When the ignition switch 1 is turned to the first active position (I) at time $t_2$, pin #4 (the $\overline{Q}$ terminal) of the monostable multivibrator (hereinafter "one-shot") 19 produces a 2-sec negative pulse which serves as a switch debouncing function. This negative pulse sets pin #5 (Q terminal) D-type of flip-flop 12 high. The output terminal of inverter (open collector) 26 is thereby rendered low in response to the high setting of pin #5 of flip-flop 12. The low output of inverter 26 enables the output of the Darlington emitter follower 44 to be almost +11 volts, which voltage turns on the gauge warning light 53 (at time $t_2$).

The pin #5 of flip-flop 12 is set low (at time $t_3$) when the output at pin #9 of the oscillator 21 goes high coincident with a low input to the D terminal of flip-flop 12, which is the output of pin #5 of oscillator 21. The output of pin #9 of oscillator 21 has a period of 7.0 seconds and pin #5 has a period of 14.0 seconds. As a result of this circuit arrangement, the interval of time during which pin #5 of flip-flop 12 is high will vary between 2 and 16 seconds. When pin #5 of flip-flop 12 goes low, the output of inverter (NOT) 26 goes high (at time $t_3$), in response to which a capacitor (not shown) controlling the input of the emitter follower 44 will start charging up to ground potential. The output of emitter follower 44 will produce a decreasing exponential voltage curve. If the potentiometer 50 is adjusted to have a resistance value R10>0 ohms, the voltage of the emitter follower output will decrease rapidly at instant $t_3$ and derease exponentially thereafter. Consequently, the gauge warning light can be discerned to dim with less concentration at instant $t_3$.

When the output of pin #5 of flip-flop 12 goes low, the one-shot 13 is triggered, thereby outputting a negative pulse having a duration of 0.22 sec. At the end of the negative pulse produced by one-shot 13 (at time ($t_4$), one-shot 14 is triggered, producing a positive pulse having a duration of approximately 0.10 sec. The length of this positive pulse represents a window of time. The time span of this window can be varied by the simple substitution of a one-shot 14 having a different pulse length.

In order to activate the starter, the operator must turn the ignition switch 1 to the second active position labeled S (start) at a time which falls within the window after recognition of the start of dimming of the gauge warning light. When ignition switch 1 is turned to the S position at time t₅, the voltage signal produced sets flip-flop 8 so that the output of pin #9 (Q terminal) goes high. In response to the high output of pin #9 of flip-flop 8, one-shot 9 will be triggered, thereby producing a positive pulse having a duration of approximately 10 msec.

The positive pulse output by one-shot 9 must coincide with the positive pulse output by one-shot 14 in order to enable NAND gate 10, the output of which goes low. This low voltage output sets the pin #8 ($\overline{Q}$ terminal) of flip-flop 15 low. In response to the low output of flip-flop 15, the output of inverter 16 goes high, thereby turning on inverter (transistor) 49 and activating the starters solenoid control relay 45 (and starter 52). Thus, in order for the operator to start the vehicle, the operator must not be impaired to such an extent that the operator is unable to turn the ignition switch 1 to position S so that the pulse output by one-shot 9 coincides with the pulse output by one-shot 14 (and corresponding in duration to the so-called window of time).

When the output of pin #5 of flip-flop 12 goes low at time t₃, the output of pin #6 (the $\overline{Q}$ terminal) of flip-flop 11 will be clocked low. This low-output will disable one-shot 19, thereby forcing flip-flop 12 to stay cleared. If the ignition switch 1 is turned to the I or S position, the output of the OR circuit 37 will be high. When the ignition switch 1 is returned to the OFF position, the output of OR circuit 37 will be set low after a 0.9-sec delay. This low output will set pin #6 ($\overline{Q}$ terminal) of flip-flop 11 high, thereby enabling one-shot 19 with flip-flop 12, and setting pin #9 (Q terminal) of flip-flop 8 low.

The counters 22, 23, 24, and 32 are cleared via the power on reset control circuit 43. The outputs of pins #8 and #9 ($Q_B$ and $Q_C$ terminals) of counter 32 will be clocked via the output on pin #6 of flip-flop 11. When three iterations have occurred (i.e. the operator has tried unsuccessfully to activate the starter three times), both outputs of counter 32 (pins #8 and #9) will be high, which will enable AND gate 33. The high output of AND gate 33 drives the output of inverter (NOT) 34 low, thereby disabling one-shot 19.

As noted previously, the output of pin #9 of the free-running oscillator 21 has a period of 7.0 seconds. The counters 24, 23 and 22 are four-bit counters operating in cascade. The count (C) terminal of counter 22 receives the pulses from pin #9 of oscillator 21. When pin #6 ($\overline{Q}$ terminal) of flip-flop 11 is set low, a predetermined count is loaded into counters 22 and 23. After a time delay of approximately 20 minutes, the counter 23 outputs a negative pulse which resets counter 32 to zero (i.e. the outputs of pins #8 and #9 are set low). Thus, the operator will be able to attempt to start the engine three more times. The setting of pins #8 and #9 of counter 32 low will drive the output of invertor (NOT) 34 high, thereby enabling the one-shot 19. Moreover, when pin #8 (the $\overline{Q}$ terminal) of flip-flop 15 is set low and the starter solenoid control relay 45 is activated, the iteration counter 32 will be reset to zero, again allowing the possibility of three further iterations. Thus, the iteration counter 32 will be reset to zero following a successful attempt to start the engine and 20 minutes after a third unsuccessful attempt to start the engine.

During the above-described resettings of the iteration counter 32, the count in counter 24 continues to run. After a time delay of approximately 8 hours, 4-bit counter 24 outputs a negative pulse which sets pin #8 ($\overline{Q}$ terminal) of flip-flop 25 low, thereby deactivating the power control relay 41. Relay 40 will also be deactivated, whereby contacts C9 and C13 are opened and contacts C4 and C6 are closed. When contacts C4 and C6 controlled by relay 40 are closed, the starter solenoid control relay 45 will be activated with the emitter follower 44 turned on. In this mode (i.e. after the impairment detection mode has ended), the gauge warning light (or lights) will operate normally.

The device of the present invention will function in the theft deterrence mode by setting switches SW2-SW4 to the OFF position and switch SW1 to the ON position. When the operator turns the ignition switch to the I position, the gauge warning light will be turned on. If switch SW3 is open (OFF), one-shot 19 will produce a 20-sec negative pulse whereby pin #5 (Q terminal) of flip-flop 12 will be set high for a time period that varies between 20 and 34 seconds. At the end of this period, then pin #5 of flip-flop 12 will go low and the gauge warning light 53 will begin to dim. In response to the dimming, the operator must turn the ignition switch 1 to the start (S) position within the window of time. However, in contrast to the impairment detection mode where the window of time equals 0.10 sec, in the theft deterrence mode switch SW4 is open (OFF) so that one-shot 14 outputs a positive pulse having a duration of 2–3 seconds. Thus, in the theft deterrence mode no test for concentration is performed, since the window of time is now 2 to 3 seconds in duration. Furthermore, when switch SW2 is open (OFF), only one attempt to activate the starter is possible. Following an unsuccessful attempt, there will be a 20-minute time delay before the iteration counter 32 is reset, whereby another attempt may be made. During this interim, if switch SW1 is closed (ON), the gauge warning light (lights) would operate normally. If the system is in the impairment detection mode, the gauge warning light will be off during the interim.

For both modes of operation, if switch SW5 is placed in the open position (OFF), the operator must initially start the vehicle in the prescribed manner, following which the operative mode will be deactivated. The vehicle will operate normally until the ignition switch is placed in the OFF position and left there for a period of 20 minutes. After this 20-min period, the operative mode will be activated. This timing pattern prevents any problem as a result of brief stops made by the vehicle, e.g. at a gas station.

The foregoing description of the preferred embodiment is presented for illustrative purposes only and is not intended to limit the scope of the invention as defined in the appended claims. Modifications may be readily effected by one having ordinary skill in the art without departing from the spirit and scope of the inventive concept herein disclosed.

What is claimed is:

1. An automotive device for preventing activation of a starter by an activator in response to untimely operation of an ignition switch following controlled dimming of a gauge warning light, wherein said ignition switch has an OFF position and first and second active positions, comprising:

(a) port means (A—A) for electrically connecting said device to said starter, said gauge warning light, and said ignition switch;

(b) first analog circuit means (44) for supplying a voltage to said gauge warning light;

(c) first digital circuit means (12,19) connected to said ignition switch for outputting a first control signal to said first analog circuit means such that a constant voltage is supplied to said gauge warning light in response to said ignition switch being turned to said first active position;

(d) variable timing means (21) for outputting timing signals to said first digital circuit means such that said first control signal is supplied to said first analog circuit means for a variable length of time;

(e) second analog circuit means (50) connected to said first analog circuit means for producing a gradual decrease in the voltage supplied by said first analog circuit means in response to the end of said first control signal;

(f) second digital circuit means (13,14) connected to said first digital circuit means for outputting a second control signal having a duration equal to a predetermined window of time at a predetermined time following the end of said first control signal;

(g) third digital circuit means (8,9) connected to said ignition switch for outputting a third control signal having a duration less than said window of time in response to said ignition switch being turned to said second active position;

(h) third analog circuit means (45) connected to said activator (51) and having first and second operative states wherein said starter is respectively activated and reactivated; and (i) fourth digital circuit means (10,15,16) connected to said third analog circuit means and to said second and third digital circuit means such that said starter (52) is activated only in response to the concurrence of said second and third control signals.

2. An automotive device for preventing activation of a starter by an activator in response to improper operation of an ignition switch, following controlled dimming of a gauge warning light, wherein said ignition switch has an OFF position and first and second active positions, comprising:

(a) energizing means for activating said gauge warning light, said energizing means having first and second operational states for respectively producing steady light and dimming in said gauge warning light;

(b) control means connected to said energizing means for controlling said energizing means wherein said control means outputs a first control signal for enabling said first operational state in response to said ignition switch being turned to said first active position and a second control signal for enabling said second operational state in response to a timing signal;

(c) variable timing means connected to said control means for outputting said timing signal at a time within a predetermined range subsequent to output of said first control signal;

(d) first pulsing means for producing a pulse of first predetermined duration representing a window of time at a predetermined time subsequent to the output of said second control signal; and (e) activation means for energizing and activating in response to said ignition switch being turned to said second active position during said window of time.

3. The automotive device of claim 2 wherein said activation means comprises a second pulsing means for producing a pulse of second predetermined duration and logic means for outputting an activation signal in response to the concurrence of said pulse of first predetermined duration and said pulse of second predetermined duration.

4. The automotive device of claim 3 wherein said second predetermined duration is less than said first predetermined duration.

5. The automotive device of claim 2, further comprising power control means having ON and OFF states for respectively activating and deactivating said device, and counting means operatively connected to said power control is placed in said ON state in response to said ignition switch being turned to said first active position and in said OFF state in response to said counting means attaining a predetermined count.

6. An automotive device for disabling a starter in response to impaired operation of an ignition switch, comprising:

(a) means for energizing a gauge warning light in response to said ignition switch being turned to a first position;

(b) means for producing dimming of said energized gauge warning light at a first instant in time subsequent to the turning of said ignition switch to said first position; and (c) means for disabling said starter in response to said ignition switch not being moved to a second position at a second instant of time, wherein said second instant of time has a predetermined relationship to said first instant of time.

7. The automatic device of claim 6, wherein said second instant of time occurs during a time interval of predetermined duration subsequent to said first instant of time.

8. The automatic device of claim 6, wherein said means for producing dimming comprises variable timing means for determining said first instant of time in accordance with an unpredictable pattern.

9. The automatic device of claim 6, wherein said means for disabling said starter comprises first pulsing means for producing a first pulse of first predetermined duration beginning at a third instant of time subsequent to said first instant of time, and second pulsing means for producing a second pulse of second predetermined duration in response to said ignition switch being moved to said second position, said first predetermined duration being greater than said second predetermined duration.

10. The automatic device of claim 6, further comprising a plurality of switching means for placing said device in either a first operational mode for detecting the operation of said ignition switch by an impaired operator or a second operational mode for preventing unauthorized operation of said ignition switch.

11. The automatic device of claim 6, further comprising means for counting the number of times said device is activated, and means for disabling said device for a predetermined duration following a predetermined number of device activations.

* * * * *